US006293267B1

(12) United States Patent
Smith et al.

(10) Patent No.: US 6,293,267 B1
(45) Date of Patent: Sep. 25, 2001

(54) FLOW-BASED CONTROL METHOD FOR AN ENGINE CONTROL VALVE

(75) Inventors: James Craig Smith, Farmington Hills; Peter James Maloney, New Hudson, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/532,431

(22) Filed: Mar. 23, 2000

(51) Int. Cl.[7] .......... F02M 25/07
(52) U.S. Cl. .......... 123/568.22; 701/108
(58) Field of Search .......... 123/568.21, 568.22, 123/339.14, 339.19, 339.2, 399; 701/108

(56) References Cited

U.S. PATENT DOCUMENTS

| | | | | |
|---|---|---|---|---|
| 4,750,352 | * | 6/1988 | Kolhoff | 73/117.2 |
| 5,107,724 | * | 4/1992 | Takizawa | 701/108 |
| 5,465,617 | * | 11/1995 | Dudek et al. | 73/118.2 |
| 5,845,627 | * | 12/1998 | Olin et al. | 701/108 |
| 5,974,870 | * | 11/1999 | Treninies et al. | 73/118.2 |
| 6,178,373 | * | 1/2001 | Davis et al. | 701/108 |

* cited by examiner

*Primary Examiner*—Willis R. Wolfe
*Assistant Examiner*—Arnold Castro
(74) *Attorney, Agent, or Firm*—Vincent A. Cichosz

(57) ABSTRACT

An improved control methodology for an engine control valve, in which the valve is positioned in response to a commanded flow rate of the controlled medium. The method involves a valve characterization procedure in which the actual flow rate is measured for various combinations of valve position and pressure ratio across the valve, subject to a standard set of upstream pressure and temperature values. This results in a table of valve position in terms of pressure ratio and standard flow rate—that is, flow rate under the standard upstream pressure and temperature values. In operation, a controller addresses the table to obtain the desired valve position as a function of a determined pressure ratio across the valve, and a desired standard flow rate determined based on the commanded flow rate and the pressure and temperature of the controlled medium upstream of the valve, relative to the standard pressure and temperature values. The required calibration effort is significantly reduced compared to the usual ad-hoc approach, and the control is based on the physical characteristics of the valve so that the commanded flow rate can be scheduled based on engine control considerations. Additionally, the control is modular in nature, which minimizes the re-design and re-calibration efforts required due to changes in system design.

4 Claims, 3 Drawing Sheets

FLOW-BASED CONTROL METHOD FOR AN ENGINE CONTROL VALVE

TECHNICAL FIELD

This invention relates to the control of an engine control valve such as an exhaust gas recirculation (EGR) valve, and more particularly to a control based on a commanded flow rate.

BACKGROUND OF THE INVENTION

An important aspect of motor vehicle engine control concerns proper positioning of a number of valves which control or regulate the passage of a compressible medium. For example, an exhaust gas recirculation valve is controlled to return a desired amount of exhaust gas to the intake air stream for emission control purposes.

A common approach utilized to control such valves is to specify a valve position in terms of various input parameters, based on extensive empirical testing and calibration. However, this approach is very time consuming and inefficient, and needs to be repeated or revised for each new powertrain configuration, or each change in an existing powertrain configuration. Furthermore, the trend in engine control is to develop model-based commands that take engine and vehicle dynamics into account, and the control methodology described above is not well suited to a model-based approach. Accordingly, what is needed is an improved control methodology that requires less calibration effort, that is less sensitive to changes in powertrain configuration, and that is more amenable to a model-based control approach.

SUMMARY OF THE INVENTION

The present invention is directed to an improved control methodology for an engine control valve, in which the valve is positioned in response to a commanded flow rate of a controlled medium. The method involves a valve characterization procedure in which the actual flow rate is measured for various combinations of valve position and pressure ratio across the valve, subject to a standard set of upstream pressure and temperature values. This results in a table of valve position in terms of pressure ratio and standard flow rate—that is, flow rate under the standard upstream pressure and temperature values. In operation, a controller addresses the table to obtain the desired valve position as a function of a determined pressure ratio across the valve, and a desired standard flow rate determined based on the commanded flow rate and the pressure and temperature of the controlled medium upstream of the valve, relative to the standard pressure and temperature values.

The calibration effort required for the control of this invention is significantly reduced compared to the conventional approach, and the control is based on the physical characteristics of the valve so that the flow rate can be scheduled based on engine control considerations. Additionally, the control is modular in nature, which minimizes the re-design and re-calibration efforts required due to changes in system design.

DESCRIPTION OF THE PREFERRED EMBODIMENT

Figure 1:
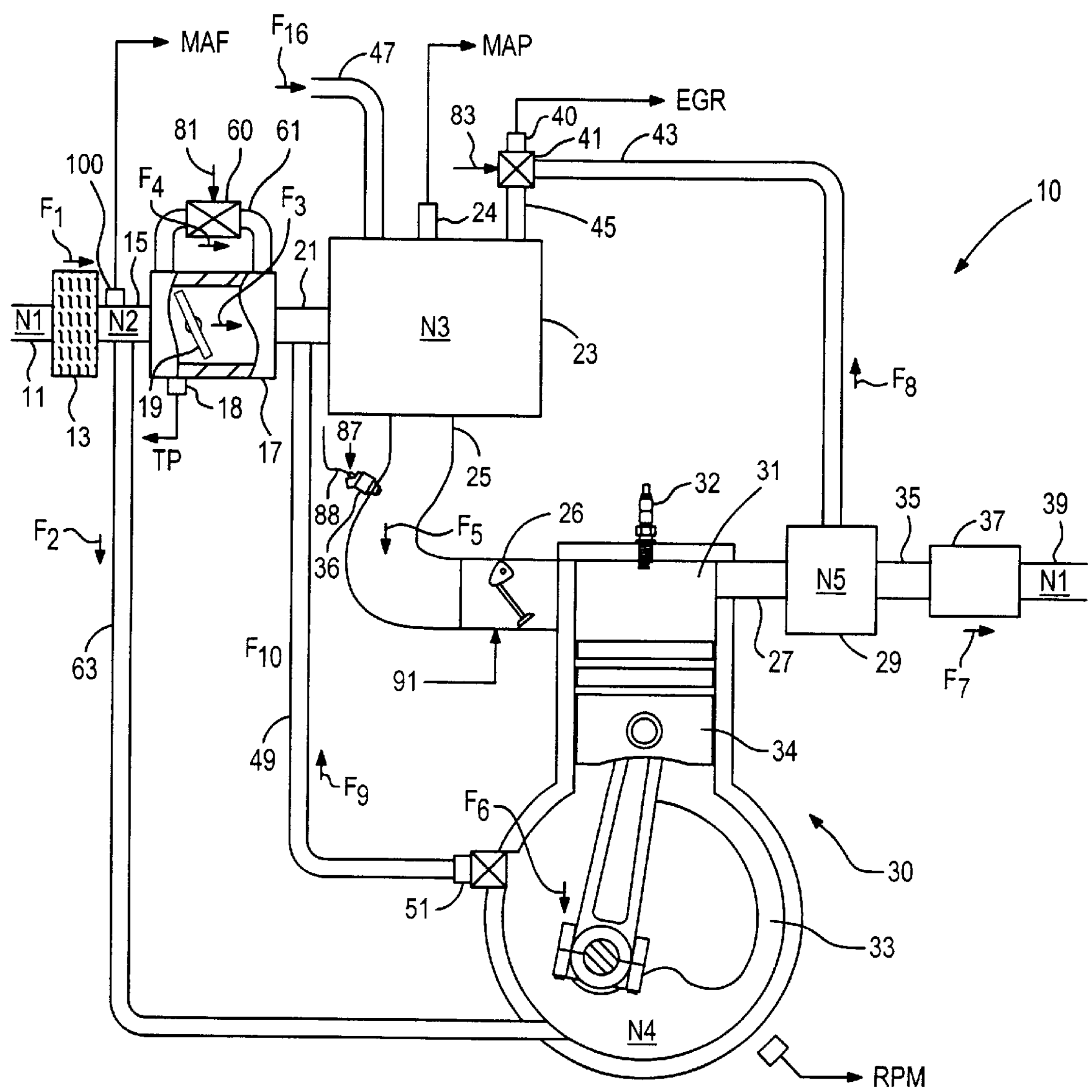
FIG. 1 is a diagram of a motor vehicle engine control, including an exhaust gas recirculation valve.

The present invention is illustrated in the context of an exhaust gas recirculation control for an internal combustion engine 10. However, as indicated above, the basic control methodology may be equally applied to other engine control valves, such as throttle valves, idle air control valves and so on. Engine 10 is diagrammatically illustrated in FIG. 1, and includes various sensors and actuators which are coupled to an electronic controller 200, shown in FIG. 4. In particular, FIG. 1 depicts the engine 10 as an interdependent network of gas mass flows designated by arrows labeled $F_1$–$F_{16}$ between a network of pneumatic volume nodes designated as N1–N7.

Inlet air at atmospheric, or barometric, pressure $Pa$, at node N1 passes through fresh air inlet 11, through air cleaner 13 and into intake duct 15 at node N2. The inlet air is drawn through throttle body 17 in which is rotatably disposed a throttle plate 19, the position of which is manually or electronically controlled to vary restriction to inlet air passing through the throttle body 17. The position of throttle plate 19 is detected by the sensor 18 and provides as an input (TP) to the controller 200. A portion of inlet air is routed past throttle plate 19 through conduits 59 and 61 and a conventional idle air bypass valve 60. The bypass valve 60 may be electrically controlled by an internal stepper motor (not shown) in response to an idle air command signal from the controller 200 on line 81 under engine idle conditions when a precise control of relatively low intake airflow is required. The position of the valve 60 may be known to the controller 200 based on the number of incremental movements or steps of the bypass valve 60 from a known limit position. Airflow out of throttle body 17 is coupled through intake duct 21 into intake manifold 23 at node N3. A conventional pressure transducer 24 is exposed to gas pressure in the intake manifold 23 and provides a manifold absolute pressure (MAP) signal in accordance therewith on line 12.

Individual cylinder intake runners 25 open into the intake manifold 23 and into the combustion chamber 31 of respective engine cylinders 30, one cylinder 30 being shown in FIG. 1. Each cylinder 30 includes a combustion chamber 31 and crankcase 33, separated by a piston 34 which engages the inside wall of the cylinder. A quantity of fuel is injected into the intake runner 25 via conventional fuel injector 87 in response to a fuel injection command signal from the controller 200 on line 88. The fuel mixes with the inlet air and is drawn into the combustion chamber 31 during a cylinder intake event during which an intake valve 26 is driven to an open position and during which a low pressure condition is present in the combustion chamber 31. The air-fuel mixture is ignited in the combustion chamber 31 during a combustion event initiated by a timed ignition arc across the spaced electrodes of spark plug 32 in response to the controller 200. The piston 34 within the cylinder 30 is reciprocally driven under the effective pressure of the combustion event for driving vehicle wheels, accessory loads, etc., as is generally understood in the art. Gasses produced in the combustion process within the combustion chamber 31 are exhausted from the combustion chamber 31 during a cylinder exhaust event and through exhaust runner 27 to exhaust manifold 29 at node N5. The exhaust gasses pass through the exhaust manifold 29 to exhaust duct 35 leading to catalytic treatment device and muffler (generally illustrated as element 37) and then to the atmosphere at the pressure of node N1.

Vacuum is selectively applied to the cylinder crankcase 33 at node N4 through a positive crankcase ventilation (PCV) conduit 49 including a standard PCV valve 51, the PCV conduit being connected between the crankcase 33 and the intake duct 21. The intake vacuum serves to draw out blow-by gasses that have been driven from the cylinder combustion chamber 31 to the crankcase 33 under the pressure of the combustion process. A supply of fresh inlet air from node N2 is provided to the crankcase 33 via a fresh air conduit 63 connected between the intake duct 15 and the crankcase 33. The PCV valve selectively draws the blow-by gasses from the crankcase 33 for mixing with intake air for consumption in engine cylinders 30 for purifying engine system lubricants.

A portion of the exhaust gasses are drawn from the exhaust manifold 29 at node N5 through an exhaust gas recirculation (EGR) conduit 43 and across an EGR valve 41 and a conduit 45 into the intake manifold 23 at node N3 for mixing with inlet air for delivery to the engine cylinder combustion chambers. The EGR valve 41 is electrically operated by the controller 200 via line 83 as described below in reference to FIG. 4 to vary the dilution of the fresh inlet air with substantially inert exhaust gas to reduce oxides of nitrogen (NOx) in the engine emissions.

Disposed between the above-described nodes are flow paths including flow path $F_1$ across the air cleaner 13 between nodes N1 and N2, flow path $F_2$ along PCV fresh air conduit 63 between nodes N2 and N4, flow path $F_3$ through throttle body 17 across the inlet air valve 19 from node N2 to intake duct 21, flow path $F_4$ through idle air bypass conduits 59 and 61, flow path $F_5$ through the intake runner 25 between node N3 and the cylinder combustion chamber 31, flow path $F_6$ between the combustion chamber and the crankcase (node N4) of an engine cylinder 30, flow path $F_7$ to the atmosphere at node N1 through catalytic treatment device and muffler elements 37 and exhaust ducts 35 and 39, flow path $F_8$ through EGR conduits 43 and 45 between node N5 and the EGR valve 41, flow path $F_9$ through the PCV conduit 49 between node N4 and the intake duct 21 (effectively at node N3).

As mentioned above, the present invention is directed to a control method for positioning an engine control valve such as the EGR valve 41 based on a commanded flow rate in the flow path $F_8$. The term "flow rate" as used herein is a mass flow rate, and may be expressed, for example, in units of kg/sec. The control methodology involves a characterization procedure for creating a flow-based valve position table, and a method of operation in which the table is used to control the valve position based on a desired flow rate.

Figure 2:
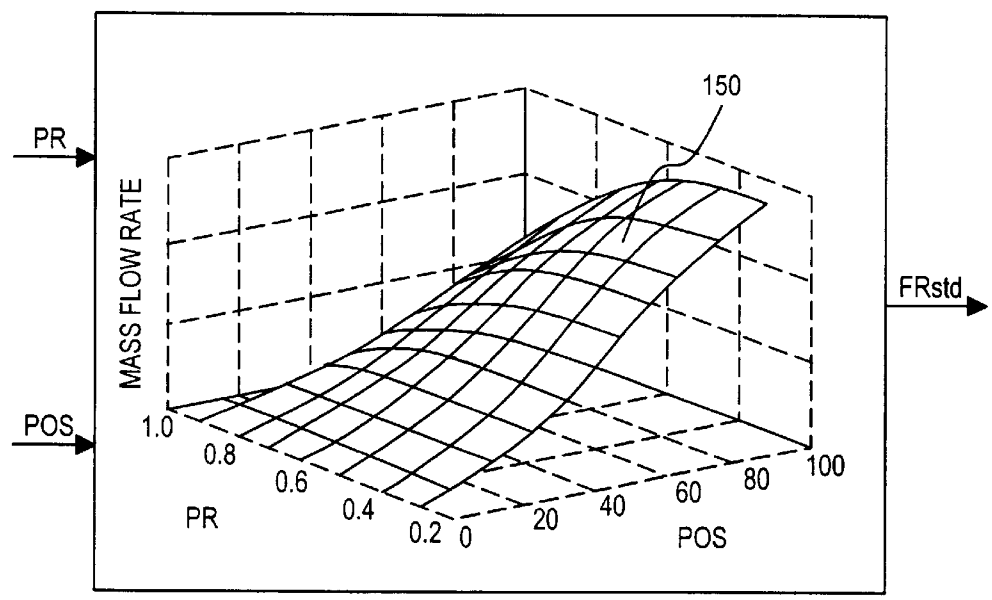
FIG. 2 is a representation of a valve characterization procedure according to this invention.

The characterization procedure is graphically depicted in FIG. 2, where the table 150 contains mass flow rate data taken under various combinations of EGR valve position (POS) and pressure ratio (PR) across the EGR valve 41. In general, the mass flow rate (FR) through the valve 41 may be mathematically expressed in terms of the valve position POS, the pressure Pu and temperature Tu of the exhaust gas upstream of valve 41, and the ratio PR of the pressure across the valve 41 as follows:

$$FR=K\ [Pu/(Tu)^{1/2}]f(PR,\ POS) \tag{1}$$

where K is a constant, and PR is defined as the ratio of the downstream pressure Pd to the upstream pressure Pu. To minimize the number of independent parameters, the upstream temperature and pressure parameters Tu, Pu are maintained constant to define a standard upstream condition; that is, $$Tu=Tstd, \text{ and } Pu=Pstd \tag{2}$$

Figure 3:
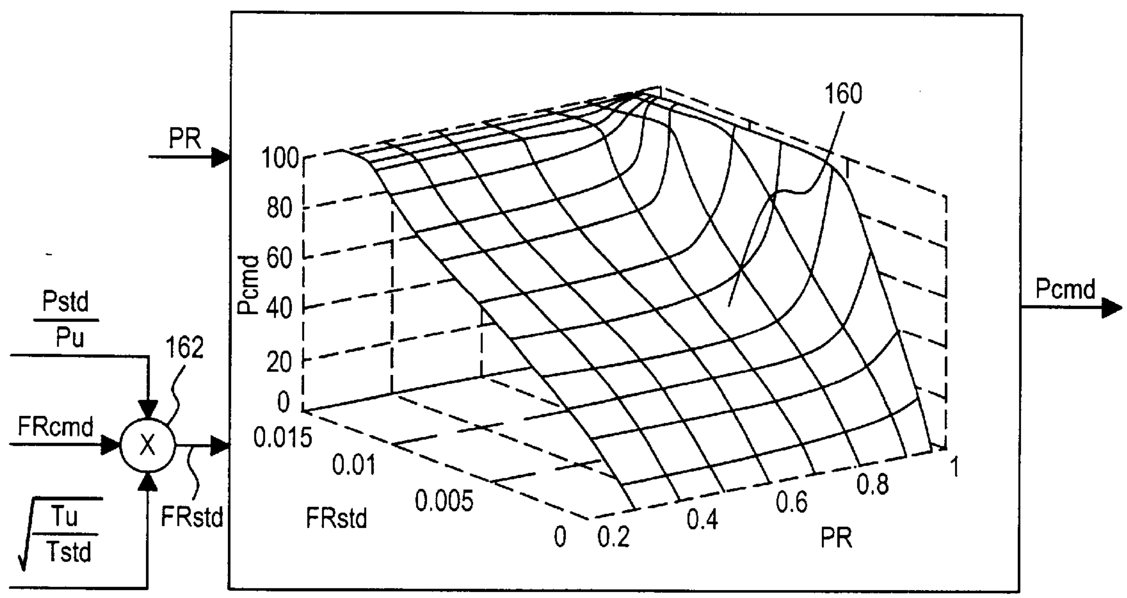
FIG. 3 is a representation of a method of operation according to this invention, based on data collected during the characterization procedure of FIG. 2.

Thus, the table data of FIG. 2 represents a standard flow rate FRstd in terms of valve position POS and pressure ratio PR, assuming the standard upstream pressure and temperature condition. The table data is then inverted as depicted in table 150 of FIG. 3 to yield a table of valve position in terms of standard flow rate FRstd and pressure ratio PR. The table data is stored in controller 200, and in engine operation, the controller 200 addresses the table based on a flow rate command FRcmd and determined pressure and temperature conditions to retrieve a corresponding valve position, which in turn, is used as a position command Pcmd for EGR valve 41. As indicated by block 162 of FIG. 3, the flow rate command FRcmd is converted to a standard flow rate FRstd based on the standard pressure and temperature values Pstd, Tstd and a measure or estimate of the actual upstream pressure and temperature values Pu, Tu, as follows:

$$FRstd=FRcmd[(Pstd/Pu)*(Tu/Tstd)^{1/2}], \text{ or} \tag{3}$$

$$FRstd=Kstd*FRcmd[(Tu)^{1/2}/Pu] \tag{4}$$

where Kstd is a constant comprehending the terms Pstd and $(Tstd)^{1/2}$.

Figure 4:
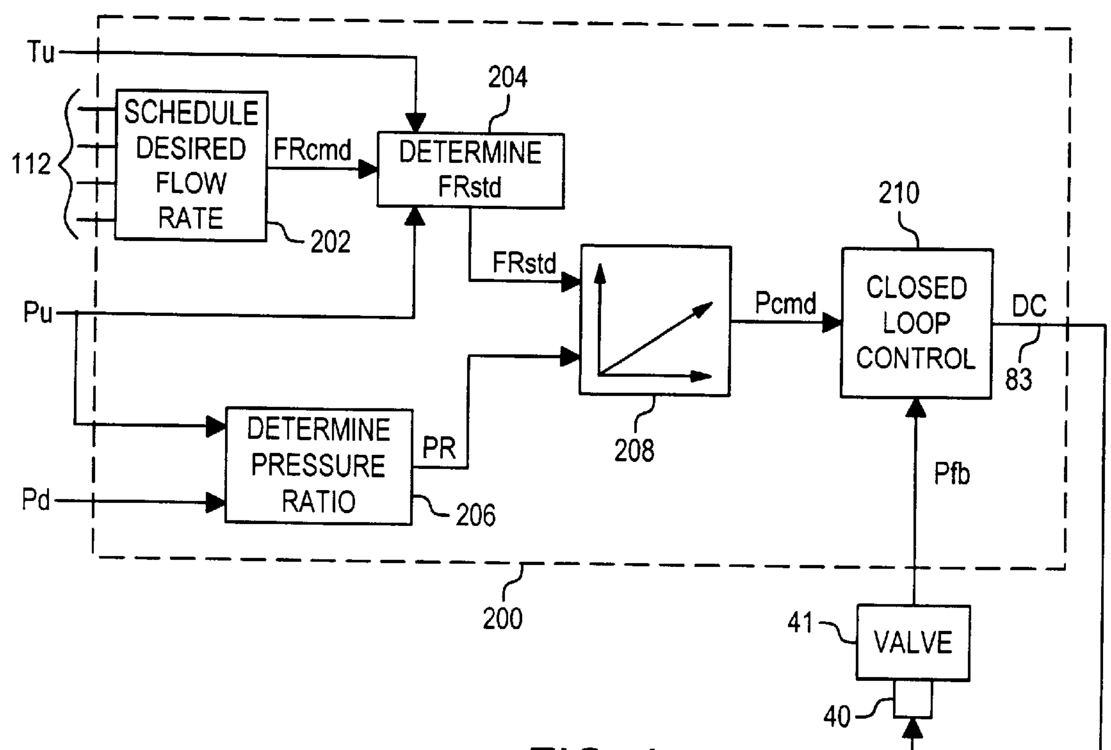
FIG. 4 is a block diagram of an overall control for the exhaust gas recirculation valve of FIG. I according to this invention, as carried by an electronic controller.

An overall block diagram of an EGR control based on the above methodology is depicted in FIG. 4, where controller 200 is depicted as comprising a series of function blocks 202–210. The block 202 schedules an EGR flow rate command FRcmd based on a number of system inputs designated generally by the reference numeral 112. The system inputs, which may include for example, RPM, MAP, and exhaust manifold pressure and temperature, may be utilized to schedule a desired EGR flow rate, as a percentage of the total intake flow rate. The corresponding EGR flow rate command FRcmd may then be computed based on the scheduled percentage and a measure of the fresh air flow rate MAF. The flow rate command FRcmd is applied along with inputs representing the upstream pressure and temperature Pu, Tu to block 204, which computes a corresponding standard flow rate FRstd as described above in reference to equations (3) and (4). In the case of EGR valve 41, the upstream pressure and temperature inputs can be represented by the pressure and temperature of the exhaust gas in exhaust manifold 29; these may either be measured or estimated based on other system parameters. The block 206 receives the upstream and downstream pressures Pu, Pd as inputs, and computes the pressure ratio PR as Pd/Pu. The upstream pressure Pu in this case may be given by MAP. The standard flow rate FRstd and the pressure ratio PR are used to address the table 208, which corresponds to the table 160 depicted in FIG. 3, yielding a position command Pcmd for EGR valve 41. The position command Pcmd, in turn, is provided as an input to closed-loop controller 210, which may be a standard proportional or proportional-plus-integral control, for example. Thus, the block 210 receives a position feedback signal Pfb from valve position sensor 40, activates EGR valve 41 at a duty cycle DC based on the deviation of Pfb from Pcmd.

In summary, the control of this invention provides an improved control methodology for an engine control valve involving a valve characterization procedure for producing a table of valve positions based on flow rate and pressure ratio across the valve, and a method of operation for using the table to command a valve position based on a commanded valve flow rate. While the present invention has been described in reference to the illustrated embodiment, it is expected that various modifications in addition to those mentioned above will occur to those skilled in the art. Thus, it will be understood that control methodologies incorporating such modifications may fall within the scope of this invention, which is defined by the appended claims.

What is claimed is:

1. A control methodology for positioning a control valve in a vehicle engine to achieve a commanded mass flow rate of a compressible medium through the valve, comprising the steps of:

collecting valve characterizing data by measuring standard flow rates through the valve for various combinations of valve position and pressure ratio across the valve, subject to standard pressure and temperature conditions of the medium upstream of the valve;

converting the collected valve characterizing data to form a table of standard flow rate in terms of valve position and pressure ratio across the valve;

during operation of the engine, determining a pressure ratio across the valve, and pressure and temperature conditions of the medium upstream of the valve;

addressing the table based on the determined pressure ratio, the commanded flow rate, and the determined pressure and temperature conditions to obtain a position command for the valve; and controlling the position of the valve based on the position command.

2. The control methodology of claim 1, wherein the step of addressing the table includes the steps of:

determining a standard flow rate corresponding to the commanded flow rate, based on the determined pressure and temperature conditions relative to the standard pressure and temperature conditions; and addressing the table based on the determined pressure ratio and the determined standard flow rate.

3. The control methodology of claim 2, wherein the standard flow rate is determined in accordance with:

$$FRstd=FRcmd[(Pstd/Pu)*(Tu/Tstd)^{1/2}]$$

where FRstd is the standard flow rate, FRcmd is the commanded flow rate, Pstd and Tstd are the standard pressure and temperature conditions, and Pu and Tu are the determined pressure and temperature conditions.

4. The control methodology of claim 1, wherein the control valve is an exhaust gas recirculation valve that returns the commanded mass flow rate of engine exhaust gas from an engine exhaust manifold to an engine intake manifold, and the upstream pressure and temperature conditions are the pressure and temperature of the exhaust gas in the engine exhaust manifold.

* * * * *